No. 641,136. Patented Jan. 9, 1900.
C. W. NASON.
STEAM TRAP.
(Application filed Oct. 27, 1898.)
(No Model.)
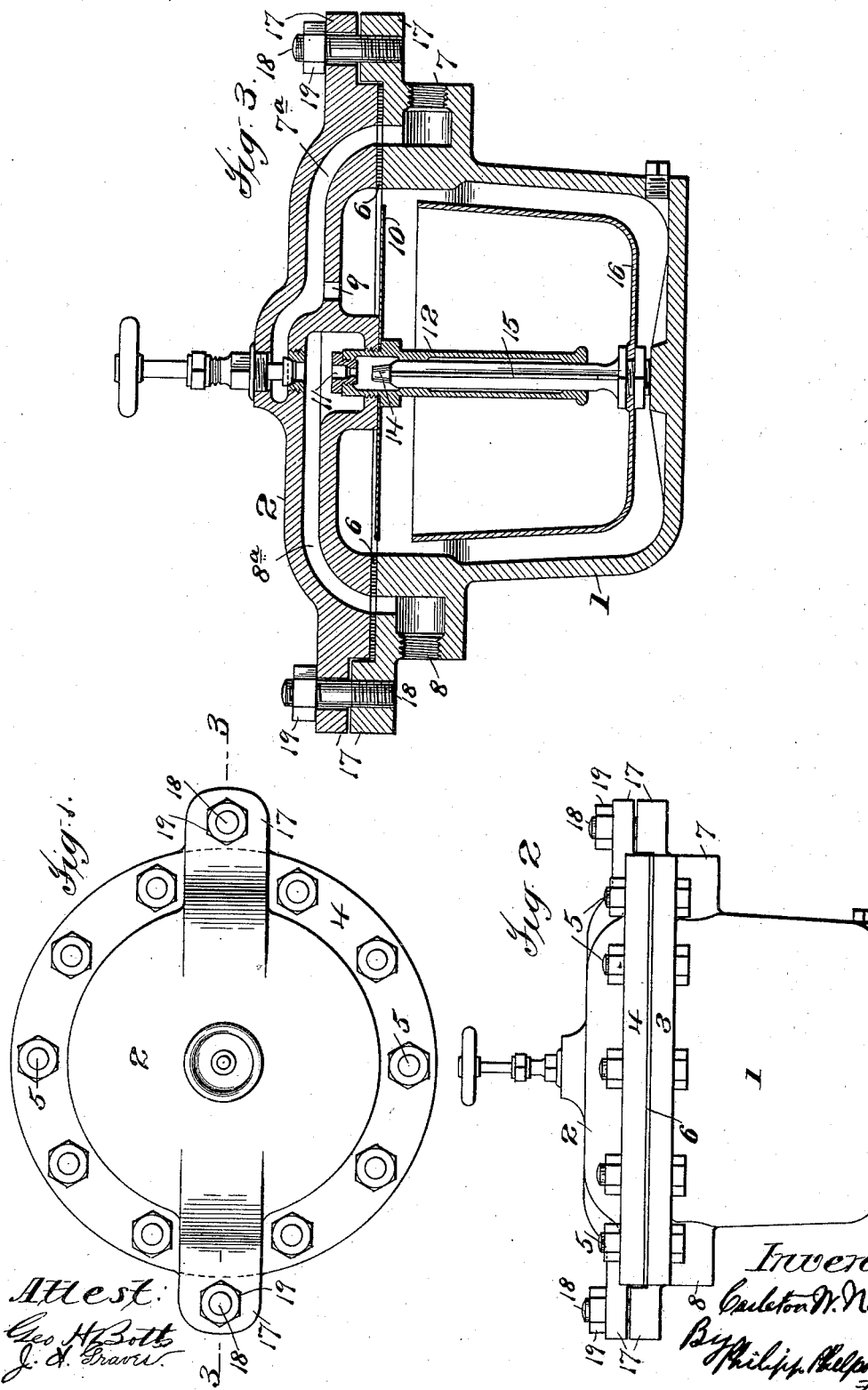

UNITED STATES PATENT OFFICE.

CARLETON W. NASON, OF NEW YORK, N. Y.

STEAM-TRAP.

SPECIFICATION forming part of Letters Patent No. 641,136, dated January 9, 1900.

Application filed October 27, 1898. Serial No. 694,669. (No model.)

*To all whom it may concern:*

Be it known that I, CARLETON W. NASON, a citizen of the United States, residing at New York, county of New York, and State of New York, have invented certain new and useful Improvements in Steam-Traps and other Casings, fully described and represented in the following specification and the accompanying drawings, forming a part of the same.

This invention relates chiefly to improvements in steam-traps of that class in which the trap-casing comprises two abutting members, one provided on opposite sides of its abutting end with inlet and outlet ports and the other with similarly-located inlet and outlet passages through which communication is established between the inlet and outlet ports, respectively, and the interior of the trap. These two members are flanged at their abutting ends and are held together with a suitable packing between them by means of bolts passing through their flanges at different points between the inlet and outlet points of the trap, or, in other words, the points at which the inlet port and passage and the outlet port and passage, respectively, meet. Because of the absence of any securing means between the two members of the casing directly at the inlet and outlet points such traps have, under conditions hereinafter more particularly pointed out, developed a serious difficulty—namely, the blowing out of the packing between the two members at these points, resulting in leakage and rendering removal of or repairs in the trap necessary.

It is the object of the present invention to overcome this difficulty; and to that end the invention, generally stated, consists in a trap-casing of peculiar construction and provided directly at the inlet and outlet points of the casing with means whereby the two abutting members of the trap-casing are held securely together at these points and the liability of leakage thereat entirely prevented.

In the accompanying drawings, Figure 1 is a plan view of a trap embodying the improvements of the present invention in what is considered their preferred form. Fig. 2 is a side elevation of the same, and Fig. 3 is a vertical section on the line 3 of Fig. 1.

Referring to said drawings, the trap-casing consists of two members 1 2, the ends whereof abut and which are provided with flanges 3 4, respectively, through which pass bolts 5, by which the two members are held together, a suitable packing 6 being interposed between the two members for the purpose of securing a steam-tight joint. The lower member 1 of the casing is provided at its abutting end on opposite sides with inlet and outlet ports 7 8, projecting laterally therefrom into the plane of the flange 3, while the upper member 2 of the casing, or what may be said to constitute the cover or top of the casing, is provided with two similarly-located inlet and outlet passages $7^a$ $8^a$. The inlet-passage communicates at one end with the inlet-port 7 and at or near its other end through an opening 9 with the interior of the trap, the usual deflector 10 being provided beneath the opening, while the passage $8^a$ communicates at one end with the outlet-port 8 and at its opposite end with the interior of the trap through a valve-opening 11 in the upper end of a pipe 12, extending down into the trap. The valve-opening 11 is controlled by a valve 14 upon the upper end of a rod 15, movable vertically in the pipe 12 and connected at its lower end to and movable with a float 16, raised and lowered in the usual way as the accumulation of water of condensation varies in the trap.

In the operation of the trap as the water enters the trap through the inlet port and passage 7 $7^a$ it accumulates in the bottom of the casing, thus raising the float 16 and its valve 14 and closing the valve-opening 11. As the water of condensation continues to accumulate it enters the float 16, thereby depressing it and withdrawing the valve 14 from the opening 11. The water of condensation is then expelled by the steam in the casing, which forces it upwardly between the valve-rod 15 and pipe 12, and thence outwardly through the outlet passage $8^a$ and port 8.

The trap illustrated as thus far described is a familiar form of the class of trap heretofore referred to and to which the present invention particularly relates. In such traps as heretofore constructed the sole means relied upon for holding together all portions of the two members 1 2 have been the flanges 3

4 and their bolts 5. Under ordinary conditions of steam-pressure such means have been found efficient for the purpose; but where a very high steam-pressure exists though efficient as to the major portions of the two members they have been found inefficient so far as those portions are concerned at which the inlet and outlet ports and passages, respectively, meet, and under such conditions have developed the serious difficulty before referred to—namely, blowing out of the packing at these points and consequent leakage. This difficulty is due to the fact that at these points the trap-casing is subjected to greater strains than at other points, and as a consequence the abutting ends of the two members are spread apart at these points to such an extent as to permit the packing between them to be blown out. In order to overcome this difficulty, it is necessary that the two members should be secured together at these two points in addition to being secured together throughout their major portions by the bolts 5 or the like. As heretofore constructed, however, it has not been practicable to so secure the two members of the trap-casing together. I have therefore devised a novel means for this purpose, consisting in the provision on each member at the inlet and outlet points of the casing of a pair of ears or lugs 17, the lugs on one member registering with those on the other and the two held together by suitable means, as bolts 18. In the specific construction illustrated and which embodies the invention in its preferred form the lower member 1 has the bolts 18 tapped into its ears or lugs 17, while the ears or lugs 17 on the other member are provided with openings through which the bolts 18 loosely pass, the bolts being provided with nuts 19 at their upper ends. With the two members thus secured together directly at these points by means additional to and extending beyond the bolts 5 for securing together the major portions of the two members all liability of spreading apart of the two members and blowing out of the packing at these two points are avoided. The ears or lugs 17 on the lower member 1 are preferably shouldered or scarfed, as seen in Fig. 3, the ears or lugs of the other member 2 being correspondingly recessed or scarfed to fit such shoulders on the lower lugs or ears.

What is claimed is—

1. A trap-casing comprising two abutting members, one bearing inlet and outlet ports and the other similarly-located inlet and outlet passages communicating therewith, said two members being secured together throughout their major portions by bolts or the like on opposite sides of the inlet and outlet points of the casing and additionally at such inlet and outlet points by bolts or the like passing through ears formed on the two members in line with and projecting laterally beyond the ports and the other securing-bolts or the like, substantially as described.

2. A trap-casing comprising the members 1, 2, bearing inlet and outlet ports 7, 8, and passages 7ª, 8ª, respectively, and provided with flanges 3, 4, held together by bolts 5, and with ears 17 in line with and projecting laterally beyond the ports and bolts 5, and secured together by bolts, 18, substantially as described.

3. A casing designed for connection with a steam system and comprising two members, one provided with a port and the other with a passage communicating therewith, said two members being secured together by bolts or the like on opposite sides of the port and additionally at the port by a bolt or the like passing through ears formed on the two members in line with and projecting laterally beyond the port, substantially as described.

In testimony whereof I have hereunto set my hand in the presence of two subscribing witnesses.

CARLETON W. NASON.

Witnesses:
T. F. KEHOE,
FRANK A. BUCKNAM.